J. F. DOUR.
LAMP.
No. 188,238.
Patented March 13, 1877.
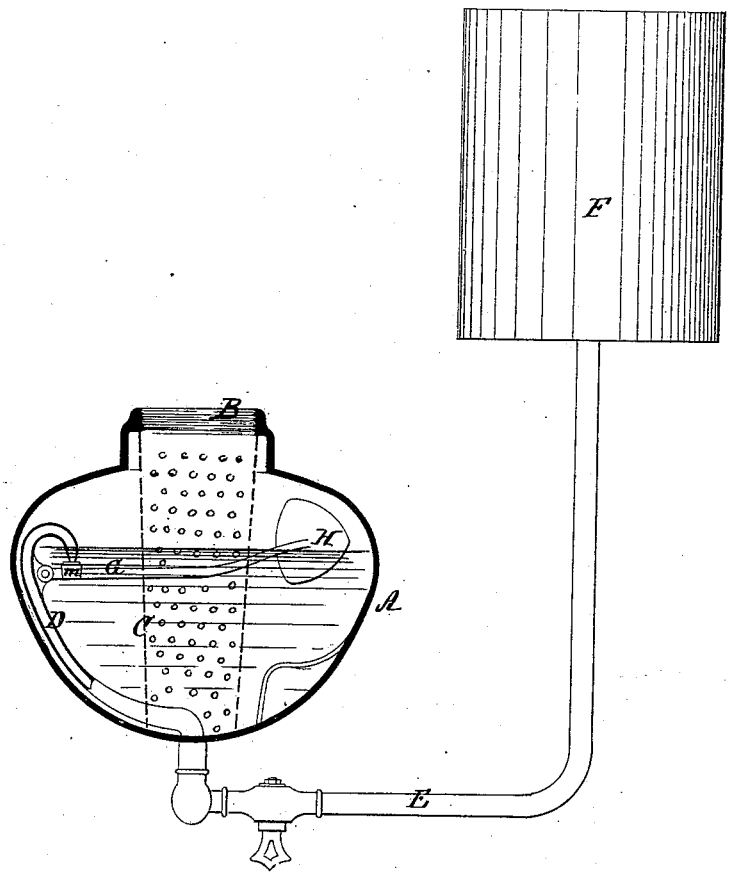
Witnesses.
W. Ehret.
John Martin.
Inventor.
John F. Dour
per Henry E. Roeder
Attorney.

UNITED STATES PATENT OFFICE.

JOHN F. DOUR, OF NEW YORK, N. Y.

IMPROVEMENT IN LAMPS.

Specification forming part of Letters Patent No. 188,238, dated March 13, 1877; application filed August 30, 1876.

*To all whom it may concern:*

Be it known that I, JOHN F. DOUR, of New York, in the state of New York, have invented a new and useful Improvement in Oil-Lamps, of which the following is a specification:

The nature of my invention consists in the arrangement of a valve, operated by a float in the inside of the lamp-bowl, to regulate and stop the supply of the oil into the bowl from a reservoir placed at any convenient position above the lamp-bowl. By this arrangement the oil in the bowl can always be kept at a certain level, and a number of lamps can be supplied by one and the same reservoir.

In the accompanying drawing, which represents a section of a lamp and its reservoir, A is the lamp-bowl, made of any desired shape or material, to the top B of which any suitable burner may be attached. To the lower part of this top B a perforated tube, C, is attached, extending to the bottom of the bowl, to inclose the lamp-wick, and prevent the same thereby coming in contact with the gearing arranged in bowl. D is a pipe, arranged in the inside of the bowl, passing through the lower part of the same, and connected, through a pipe, E, with a reservoir, F, placed in any convenient position above the lamp. G is a lever arranged in the inside of the bowl A, moving on a fixed center, and provided with a suitable float, H, at its end. On this lever G a suitable projection, m, covered with some soft material to act as a valve against the mouth of the pipe D, is arranged.

When the oil, supplied through the pipe E from the reservoir F, has obtained the desired level in the bowl A, the float H will be raised, bringing thereby the projection or valve m tight against the mouth or end of the pipe D, preventing thereby any further flow of oil into the lamp-bowl A, until the consumption of the oil, by the burning of the lamp, will lower this fixed level, when the float H will fall with the level of the oil, and the opening of the pipe D be uncovered to admit a further supply.

By this arrangement any number of lamps may be supplied by one and the same reservoir, and the oil in the lamp-bowl will always be retained at one and the same level.

What I claim as my invention, and desire to secure by Letters Patent, is—

A lamp-bowl, A, provided with a pipe, D, connected, through a suitable pipe, E, with a reservoir, F, in combination with a lever, G, having a float, H, at its end, and provided with a suitable projection, m, acting against the end opening of the pipe D, substantially in the manner and for the purpose herein described.

JOHN F. DOUR.

Witnesses:
 HENRY E. ROEDER,
 J. B. NONES.